United States Patent [19]

McKinnon

[11] 3,936,039

[45] Feb. 3, 1976

[54] LOAD-LEVELLING SHOCK ABSORBER

[75] Inventor: Paul G. McKinnon, Brigham City, Utah

[73] Assignee: Tropic Industries, Inc., Salt Lake City, Utah

[22] Filed: June 21, 1974

[21] Appl. No.: 481,887

[52] U.S. Cl. .............................. 267/34; 267/64 R
[51] Int. Cl.² .................................... B60G 11/56
[58] Field of Search ............... 267/34, 9, 4, 64 R

[56] References Cited
UNITED STATES PATENTS

| | | | |
|---|---|---|---|
| 2,918,273 | 12/1959 | Whisler et al. ................... | 267/34 |
| 3,332,677 | 7/1967 | Long, Jr. ........................... | 267/34 |
| 3,353,813 | 11/1967 | Erdmann et al. ................. | 267/34 |

*Primary Examiner*—James B. Marbert
*Attorney, Agent, or Firm*—Criddle & Thorpe

[57] ABSTRACT

A load-levelling shock absorber unit including a guide piston and piston rod and a first surrounding ride control cylinder, one of which is adapted to be connected to a first sprung mass and the other of which is adapted to be connected to an unsprung mass; an oil reservoir cylinder surrounding the ride control cylinder; and an expansible lift cylinder. The ride control, oil reservoir and lift cylinders are all preferably concentrically arranged and are of the hydraulic type. The piston rod reciprocates within the ride control cylinder and, so long as the piston is centrally positioned within the first cylinder, a lagged control valve does not displace sufficiently to allow repositioning of the outer wall of the lift cylinder. Movement of the piston beyond a predetermined central portion for a predetermined time period will move the control valve such that further reciprocation of the piston rod will reposition the outer wall of the lift cylinder so that a spring attached thereto and to one of the masses is moved within the first cylinder, until the over-all shock absorber length is substantially re-established.

15 Claims, 10 Drawing Figures

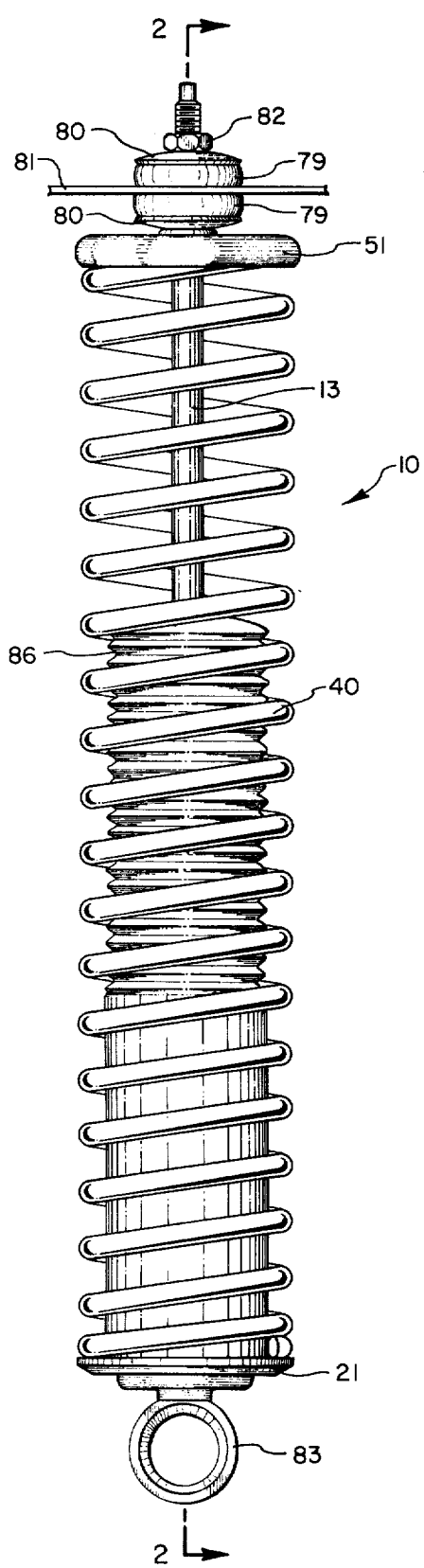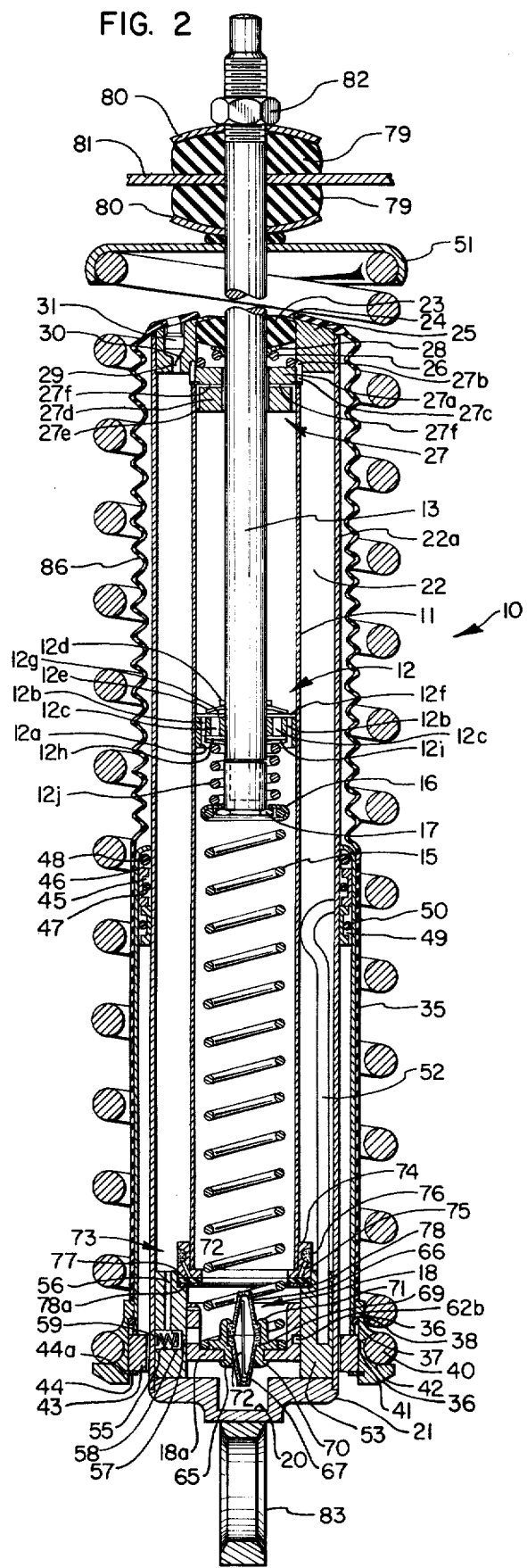

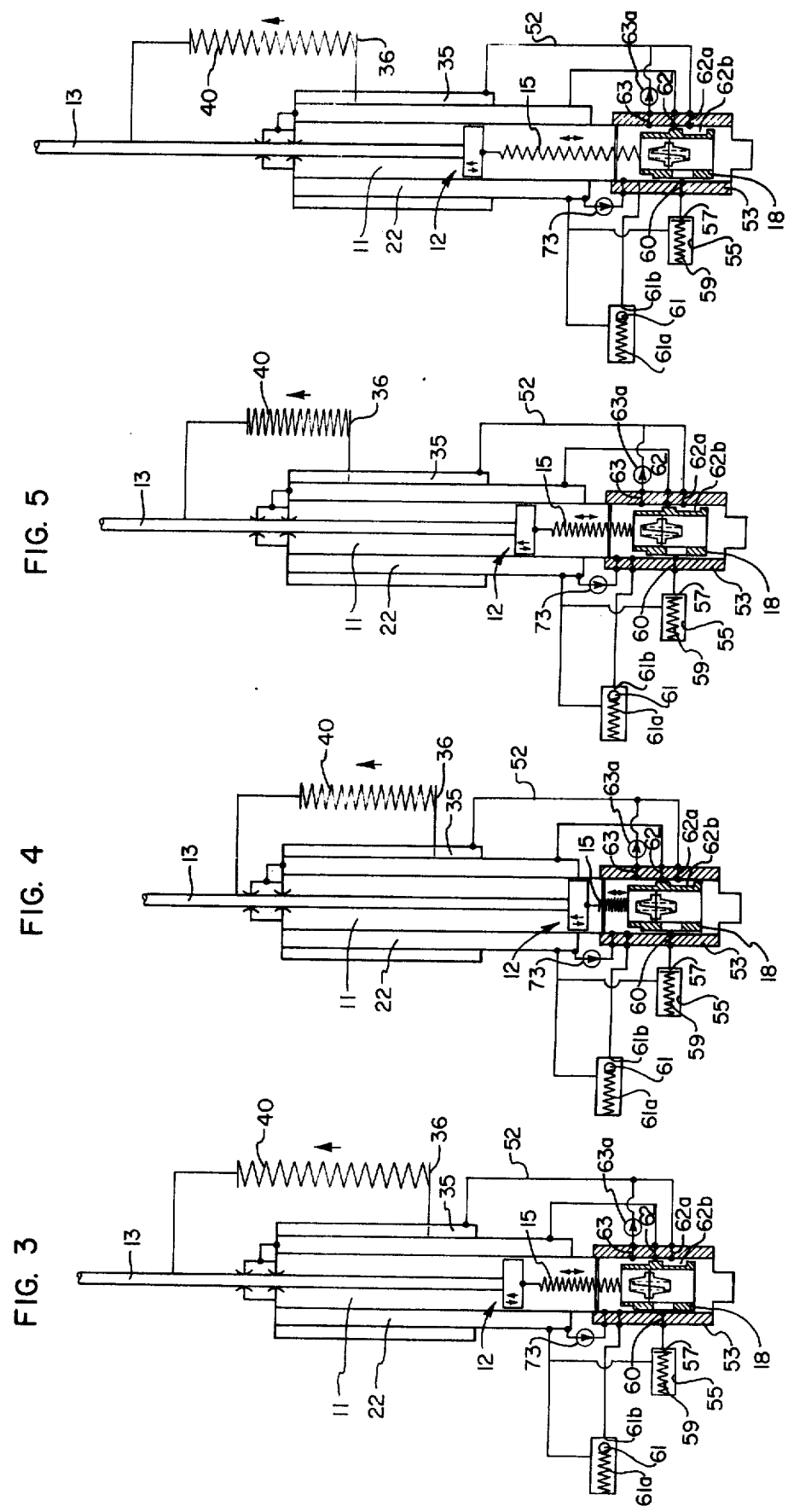

FIG. 7
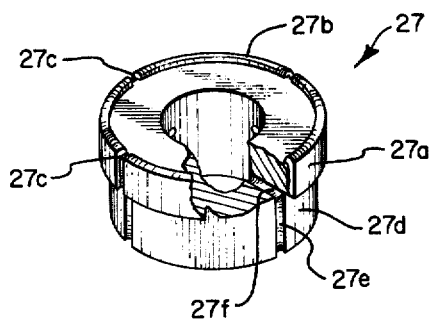
FIG. 8
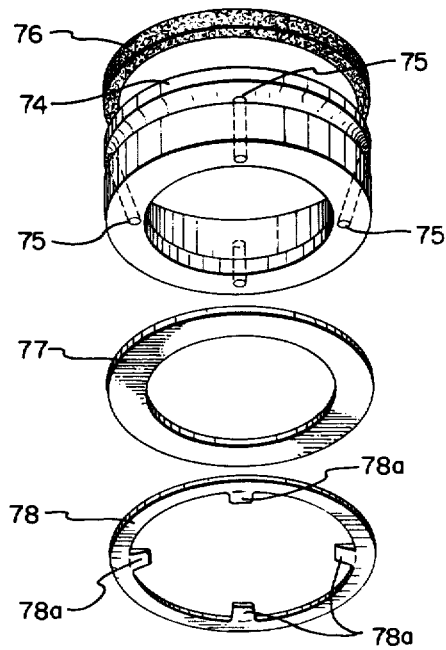
FIG. 9
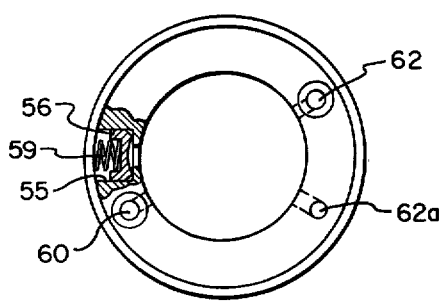
FIG. 10

LOAD-LEVELLING SHOCK ABSORBER

BRIEF DESCRIPTION OF THE INVENTION

1. Field of the Invention

This invention relates to direct acting shock absorbers of the type used on vehicles and the like, and particularly to such shock absorbers having automatic load levelling means associated therewith.

2. Prior Art

Vehicular shock absorbers have long been known, and shock absorbers and shock absorbing systems designed to maintain vehicle level under varying conditions of loading have been proposed in the past. It is well recognized that if a vehicle is maintained level, even under varying load conditions, the steering, riding, and braking characteristics of the vehicle are vastly improved. In the past, fluid systems have been proposed wherein motor driven pumps and sensing devices are used to maintain a vehicle level, or, as shown in U.S. Pat. No. 3,381,952, it has been proposed that shock absorbers be provided with the necessary pumping pistons and valves to automatically compensate for load variations placed on the shock absorber. These known systems and shock absorbers, while possibly being satisfactory in some respects, are not entirely satisfactory because of their costs and slow response time, or because they do not satisfactorily compensate in a satisfactory manner for extreme loading conditions encountered in use.

SUMMARY OF THE INVENTION

Principal objects of the present invention are to provide a reliable, low-cost, shock absorber that will automatically restore a desired vehicle level when the level has deviated beyond predetermined limits and for predetermined time periods.

Other objects are to provide a shock absorber that can be used in place of, or in conjunction with, conventional, non-self-levelling shock absorbers on vehicles, and that will provide vehicle levelling when needed, but that will not act so quickly as to cause undesired fluctuations in the vehicle level.

Principal features of the invention include a piston, operating in a hydraulic, ride control cylinder and having a movable component of a control valve connected thereto by a spring. Movement of the movable component of the control valve is regulated by the position of the piston in the ride control cylinder, the extent of compression or expansion of the spring, and a dashpot.

The position of the movable component of the control valve regulates flow to and from an oil reservoir, and an expansible lift cylinder. The cylinders and the reservoir are concentrically arranged and the cylinders are in communication through a check valve permitting flow from the ride control cylinder to the interior of the expansible cylinder, but preventing reverse flow. Other passages, controlled either by check valves or the control valve are provided between the ride control cylinder and the reservoir and between the lift cylinder and the reservoir.

A strong main spring extends between the outer movable wall of the lift cylinder and a spring retainer that may be slidable on a piston rod, but is movable with the piston in the ride control cylinder. Means are provided for connecting the piston rod to one of two masses between which shock absorbing action is desired. The housings of the ride control cylinder and the oil reservoir have means thereon whereby they can be connected to the other of the masses.

A control valve spring, interconnects the ride control piston and the movable component of a sleeved control valve. The movable component of the control valve reciprocates within the ride control cylinder and restricted flow through sintered metal filters and a small central orifice provides a dashpot action that regulates the rate of movement of the valve component. The rate of movement of the valve component is also regulated by the varying spring rate of the control spring as it is placed in tension and compression.

When the piston is reciprocated within a central portion, such as in response to axle undulations resulting from travel of a "normally loaded" vehicle to which the shock absorber is attached, the dashpot prevents free movement of the movable component of the control valve to a lowered position and flow is permitted between the reservoir and the ride control cylinder as the main spring compresses and expands in response to relative movement between the vehicle frame and a wheel.

If, however, a heavy load is placed on the vehicle and the mean length of the load levelling unit between masses is held in a compressed state for a sufficiently long time period, the control spring will also be compressed and will act on the movable component of the control valve to force fluid through the dashpot orifice as the control valve component is moved to a lowered position. As the ride control piston rod moves into the ride control cylinder it will displace fluid from the ride control cylinder, through the lowered control valve component and into the expanding lift cylinder at a location between a seal fixed to the ride control cylinder and a seal fixed to and movable with the outer wall of the expansible lift cylinder. This forces the expansible lift cylinder upwardly, carrying and compressing the main spring and carrying the piston therewith, until the ride control piston is in a mean central portion of the ride control cylinder. The over-all shock absorber length is then essentially the same as when the vehicle is in a "normal" load condition and the main spring is partially compressed and is carrying and supporting any load added to the vehicle. At this time, the control valve is again moved upwardly through the spring connecting it to the ride control piston and flow from the ride control cylinder to the expansible lift cylinder is cut-off.

When the overload is removed from the vehicle, the shock absorber main spring expands, raising the vehicle, and moving the ride control piston to an upper position in the ride control cylinder and moving the piston rod out of the ride control cylinder. Oil from the reservoir is pulled into the ride control cylinder as the piston rod is moved out and oil from the lift cylinder is moved into the reservoir, thereby allowing the outer wall of the lift cylinder and the spring carried thereby to drop until the over-all effective length of the load leveller is again "normal", i.e., the same as the over-all length under the loading conditions for which the unit is designed.

A portion of the wall of the oil reservoir serves as a fixed inner wall for the expansible lift cylinder and the main spring at all times surrounds the outer movable wall of the lift cylinder and the portion of the oil reservoir wall that serves as an inner wall of the lift cylinder. The spring thus serves to protect the walls of the lift cylinder from damage due to rocks or other objects during use of the shock absorber. In addition, if desired, a flexible protective boot can be positioned between the main spring and the reservoir housing and lift cylinder outer housing. Road undulations occurring as the vehicle travels will pump oil from the ride control cylinder and from the expansible lift cylinder into the oil reservoir and from the reservoir to the ride control cylinder in response to movement of the piston rod in and out of the ride control cylinder. This allows the ride control piston to be held in a centered position when the over-all length of the shock absorber or load leveller corresponds to that obtained when the unit is in a "normal" loading condition.

Additional objects and features of the invention will become apparent from the following detailed description and drawings, disclosing what is presently contemplated as being the best mode of the invention.

THE DRAWINGS

In the drawings:

FIG. 1 is a side elevation view of a load levelling shock absorber of the invention;

FIG. 2, an enlarged, vertical sectional view, taken on the line 2—2 of FIG. 1 and showing the load leveller in a "normal" load condition;

FIG. 3, a schematic view showing the load leveller in the "normal" load condition of FIG. 2;

FIG. 4, a view like that of FIG. 3, but showing the load leveller in a heavily loaded condition and before the load leveller has been operated to adjust for the heavily loaded condition;

FIG. 5, a view like that of FIG. 3, but showing the load leveller after it has adjusted for the heavily loaded condition;

FIG. 6, a view like that of FIG. 4, but showing the load leveller after the heavy load has been removed and before the load leveller has adjusted to the removal of the load;

FIG. 7, a perspective view of the spring retainer member surrounding the rod and closing off one end of the ride control cylinder, drawn to an enlarged scale;

FIG. 8, an exploded, perspective view of the oil-in valve components, drawn to the scale of FIG. 7;

FIG. 9, a top plan view of the spool valve body, partially cut away for clarity; and FIG. 10, a view like that of FIG. 3, but showing another embodiment of the invention.

DETAILED DESCRIPTION

Referring now to the drawings:

In the illustrated embodiment, the load leveller of the invention, shown generally at 10, includes a ride control cylinder 11, with a ride control piston 12 therein. The ride control piston has a rod 13 projecting from one face thereof and extending through one end of the ride control cylinder.

A spring 15 is fixed to the other face of the ride control piston by a spring retainer 16 and nut 17 and the other end of the spring is connected to one side of a control valve, shown generally at 18.

A reservoir 22 formed in a tubular reservoir wall 22a surrounds the ride control cylinder 11, with one end of the reservoir wall closed by a valve assembly to be described and the cap 21. Rod 13 passes slidably through a seal 23 at the other end of the reservoir tube. The seal 23, which may be of Neoprene, or the like, is held against a flange 24 of a seal cap 25 by a spring 26. Spring 26 has one end seated on a restrictor bearing 27 that is fitted into the seal cap 25, surrounds the rod 13, and seats on the end of the ride control cylinder 11. The other end of the spring engages a washer 28 that is seated against the seal 23.

Restrictor bearing 27, (FIGS. 2 and 7) has an enlarged portion 27a forming a collar around the rod 13 and resting against and sealing the end of the ride control cylinder. A ring-shaped bead 27b extends slightly upward from a top surface of the enlarged portion 27a and notches 27c are formed in the periphery of the enlarged portion and through the bead 27b. The notches 27c thus form very small ports interconnecting the reservoir 22 and the space between restrictor bearing 27 and the seal 23. A limited oil flow is thus permitted between the oil reservoir and the space between the retainer member and seal and that oil trapped within the space will thereafter serve as a liquid seal, as will be further explained.

The restrictor bearing 27 fits around the rod 13 tight enough to normally prevent oil flow therebetween while still allowing air movement therebetween. In addition, for air scavenging, a smaller portion 27d that extends into the end of the ride control cylinder 11 has notches 27e spaced around the periphery thereof and extending from the free end of the smaller portion to the enlarged portion and ports 27f that communicate the notches 27e with the center of the restrictor bearing.

During operation of the load leveller and movement of the ride control piston 12 into the ride control cylinder 11 some air is sucked into the ride control cylinder and, as the piston is moved out the air is displaced. Even if the load leveller is tipped so that the ride control cylinder is not vertical, and even though oil in the cylinder may then be blocking passage of air through the lower central portion of the spring retainer, one or more of the notches 27e will be opened to any accumulated air and the air can then escape through the notches 27e, ports 27f and the center of the restrictor bearing 27.

A filler passage 29 is provided through the seal cap 25 and a seat 30 is provided in the passage. A set screw 31 is threaded into the filler passage and has a tapered portion to cooperate with the seal in closing off flow into and out of the reservoir 32 formed between the reservoir tube 22a and the ride control cylinder 11. The screw is loosely enough threaded into the filler passage to allow air passage therethrough into and out of the passage and to filter out dirt particles, while preventing loss of liquid from the reservoir.

As is well known in the shock absorber art, the piston 12 has ports therethrough to allow controlled oil passage through the piston when predetermined pressure differentials are developed in response to piston movement. As best seen in FIG. 2, the piston head is recessed at 12a and ports 12b extend therethrough adjacent to the outer periphery of the recessed portion, while ports 12c extend therethrough inboard of the ports 12b. A washer 12d is fixed to the piston rod 13 and a star shaped, dished spring 12e is positioned between the washer and a flexible flat valve 12f that overlies the outer ports 12b. The spring 12e thus biases the valve into a closed position over the ports 12b and the spring construction determines the pressure at which the valve will open to allow flow through the ports 12b when the piston rod 13 is moved into the ride control cylinder 11. Openings 12g are provided through the valve 12f and washer 12d so that the valve and washer do not obstruct flow through the inner ports 12c.

Another flexible, flat valve 12h fits within the recessed portion 12a of piston 12 and inside the spaced ports 12b to cover the ports 12c. A backing member 12i rests against the valve 12f and presses it into sealing relationship over the ports 12c and a spring 12j acts between the nut 17 and the backing member 12i to hold the backing member against the valve 12h. It will be apparent that as the piston rod 13 is moved out of the ride control cylinder, oil can move through the piston 12 via ports 12b and 12c and that the construction of spring 12j will determine the pressure at which the valve 12h will open to allow flow therethrough.

A lift cylinder 35 is telescoped around the reservoir cylinder and a spring retainer 36 is held in place at one end thereof by a snap ring 37 positioned in an encircling groove provided therefor in the lift cylinder wall. A lip 38 on the spring retainer engages the snap ring and one end of a main spring 40 seats in a groove 41 and on a shoulder 42 of the spring retainer. A ring-shaped bearing member 43 surrounds the reservoir tube 22a at the end of the lift cylinder and is held in place by a snap ring 44 that is partially inserted into a groove 44a of the spring retainer. So arranged, the bearing member 43 is secured between the lift cylinder 35 and the snap ring 44 and will slide along the outer wall of the reservoir cylinder as it moves with the lift cylinder.

The end of the lift cylinder 35 opposite to the bearing member has a pair of seal retainer grooves 45 and 46 formed therein. An O-ring seal 47 of Neoprene or the like, is provided in the groove 45 and a wiper seal 48, of felt material or the like, is provided in the groove 46. The seals 47 and 48 both engage the outer surface of the reservoir cylinder and prevent fluid flow therepast from the space between the lift tube and the reservoir cylinder.

Another seal retainer groove 49 is fixed to and extends around the reservoir cylinder 22, a spaced distance away from the O-ring seal 47 and towards the bearing member 43. An O-ring seal 50 is provided in the groove 49 to seal between the lift tube and the reservoir cylinder. The walls of the seal retainer grooves 45 and 49 will abut when the lift cylinder is in a retracted condition (to be further explained) to prevent engagement of the O-ring seals 47 and 50 and to allow liquid to enter and leave the lift cylinder between the O-rings, as will be further explained.

As previously noted, main spring 40 has one end seated on the spring retainer 36 which forms a base for the main spring and, the other end of the spring is held within a spring retainer 51, FIG. 1, at the end of the piston rod 13 projecting from the ride control cylinder.

A lift cylinder tube 52 is positioned within the reservoir cylinder and has one end connected to a main control valve body 53, and the other end fitting through an opening 54 in the wall of the reservoir cylinder.

As heretofore described, the walls of the seal retainer grooves 45 and 49 abut when the lift cylinder is in a retracted condition. In this condition, fluid can move into and out of the lift cylinder through tube 52 since the opening 54 is positioned at the point where the walls of the retainer grooves abut. It will be apparent that fluid under pressure, moving into the lift cylinder, will act against the O-ring seals 47 and 50 to slidably move the seal 47, the lift cylinder 35 and the spring retainer 36 along the outer wall of the reservoir cylinder. When the load leveller is arranged such that the spring retainer 51 is up, fluid, under pressure moving into the lift cylinder, will raise the spring retainer 36 to change the level of the base on which the main spring 40 is rested.

The main control valve body 53 fits within the reservoir tube 22a and at one end of the ride control cylinder 11. As will be further explained, the control valve includes a movable component or spool valve assembly that is addapted to reciprocate within the main control valve body 53.

A bore 55 (FIGS. 2–5) is provided in one side wall of the control valve body 53 and a passage 56 through the valve body communicates the bore 55 with the reservoir 22. Another port 57 through the reservoir cylinder wall is adapted to communicate the bore 55 with the interior of the ride control tube, via the control valve spool assembly 18a. A cup-shaped, low pressure valve head 58 is positioned in bore 55 and is held in place, seated against and closing off the passage 56, by a low pressure spring 59 that has one end in the cup-shaped valve head and the other end seated against the interior of the reservoir wall 22a.

The control valve body 53 is also provided with a high pressure port 60, FIGS. 3–5, therethrough. Port 60 extends through the interior side wall of the ride control cylinder and upwardly through the side wall to open into the reservoir 22. A high pressure valve, comprising a ball-type valve head 61 and a spring 61a that biases the head against a valve seat 61b formed in the port 60 is provided to prevent flow through the port 60 unless a predetermined high pressure level is reached in the ride control cylinder. In addition, dump return ports 62 and 62a are provided through the control valve body 53, and when connected by a groove 62b in the valve spool assembly will establish communication between the ride control cylinder to the reservoir 22 via the lift cylinder tube 52.

A passage 63 through the main control valve body 53 interconnects the lift cylinder tube 52 and the interior of the ride control tube and a check valve 63a in the passage 63 allows flow from the ride control tube to the lift cylinder tube, but prevents reverse flow.

The control valve, shown generally at 18, includes the cup-shaped spool assembly 18a (FIG. 2) that fits tightly, but slidably within the main control valve body 53, below the ride control cylinder 11. A central port 65 is provided through the body 18a and sintered metal filters 66 and 67, each of a generally truncated cone configuration, are positioned with their bases abutting and with the filter 67 extending through the port 65. A filter retainer 69 clamps the filter bases together and fits through the port 65 to be secured in place by a flange 70 at one side of the port 65 and a crimped edge 71 at the other side of the port 65. So arranged, the only flow from one side of the body 64 to the other side is through the filters 66 and 67. The groove 62b partially encircles the body 64 and when the body is at a predetermined location within the main control valve body 53 will communicate the dump ports 62 and 62a with the lift cylinder tube 52, as has been previously described.

The end of spring 15 engaging the valve spool assembly 18 fits within the cup-shaped body and around the filters and filter retainer 69 and is anchored thereto. It will be apparent that when the spring is fully compressed it will fit within the body 18a. A scouring pin 72 is loosely positioned within the filters and is moved by flow through the filters to keep them clean.

The spring retainer 16, that secures the other end of spring 15 to the piston 12, is secured to the end of rod 13 by the nut 17 that is threaded onto the rod, as previously described.

An oil-in check valve assembly 73 rests on the main valve body 53 and sealingly receives the lower end of the ride control cylinder 11. The oil-in check valve assembly includes a ring shaped body 74 with ports 75 extending inwardly and downwardly therethrough to communicate the oil reservoir with the interior of the lift cylinder. A band of mesh material 76 surrounds the body 74 and the ports 75 and serves as a filter for liquid passed therethrough, and a ring-shaped, flat valve 77 is positioned to lie beneath and to cover the ports 75. A ring shaped Bell spring 78 is positioned between the valve body 53 and the flat valve 77 and has resilient fingers 78a that bias the flat valve into sealing engagement around the ports 75. The valve 77 thus serves as a check valve permitting flow from the reservoir to the interior of the ride control cylinder, while preventing reverse flow.

In use, the load leveller will normally be installed such that the piston rod 13 is connected to an unsprung mass such as an automobile frame by means of resilient washers 79 (FIG. 1), which are sandwiched between solid washers 80 that surround a threaded upper end of rod 13. The resilient washers are placed on opposite sides of a frame member 81 (shown fragmentarily), with a solid washer 80 engaging the spring retainer 51 and with a nut 82 threaded on the rod 13 to hold the assembly together. The end cap 21 is fixed to an unsprung mass, which may be a wheel of the automobile, by a ring 83, and the load leveller is ready for operation.

In operation, the load leveller 10 will normally be arranged such that the piston 12 is in an intermediate position within the ride control cylinder 11. If the ride control cylinder is forced momentarily upwardly with respect to the piston, such as may occur when the wheel to which the cylinder is connected bounces sharply up, or when the vehicle is turned to place extra temporary loading downwardly on the piston rod the piston 12 will move and, through the spring 15 will tend to move the control valve spool assembly 18a. However, since the central port 65 through the control valve spool assembly 18a is small, the control valve spool assembly will lag behind the piston 12 in movement. Thus, if the piston moves back to the intermediate position it was in before such momentary movement, the spool assembly will be moved back to its starting position before any change of the state of the load leveller can occur as a result of flow through the spool assembly. During the momentary up and down movement, i.e., undulating movement of the piston rod, downward travel of the piston rod will displace oil from the ride control cylinder 11 to the oil reservoir 22 through the low pressure valve 58 and movement of the piston rod out of the ride control cylinder will suck oil into the ride control cylinder 11 from the oil reservoir 22 through the oil-in check valve 73. If, however, the piston 12 is moved in response to movement of the rod 13 in or out of the ride control cylinder and is held in a new position long enough for the spool assembly to fully move into a follower position, i.e., a position at which the flow path through the valve is changed, either above or below the position at which it is normally held by spring 19, then the spring retainer 36 which serves as a base for the main spring 40 will be repositioned.

When the spool assembly is moved to a lowered follower position, such as may occur when a more than normal load is placed on the rod 13 to move it downwardly into the ride control cylinder, and such load is not removed before the spool valve assembly moves to a follower position, the load leveller is in a "pump" condition. In this condition, port 57 is blocked off by the spool assembly and the oil displaced as the piston rod 13 moves into the ride control cylinder can no longer move through the low pressure valve but instead is forced through passage 63 and check valve 63a into the lift cylinder, thereby raising the base of the main spring 40 and the load compressed main spring as has been previously described. The over-all length of the load leveller is thus reestablished to be about the same as it was prior to the placing of the increased load on the rod 13. If the outer wall of the lift cylinder has moved to the maximum extent possible and the loading on rod 13 acts through spring 15 to move the spool valve down high pressure relief valve 61 will open to allow oil from the ride control cylinder to be discharged into the oil reservoir. The high pressure relief valve 61 allows a pressure build up in the ride control cylinder that will serve as a cushion when the piston rod is moved into the cylinder and the lift cylinder is fully raised. Any movement of the rod out of the cylinder at this time will cause the oil-in check valve 73 to open and oil to move from the reservoir 22 to the ride control piston.

If the rod 13 is moved out of the ride control cylinder 11 for an extended time period, such as may occur if an excess load acting through the rod is removed, the piston 12 will move towards the upper end of the ride control cylinder. As the piston 12 is moved upwardly by expansion of the unloaded main spring 40 as shown in FIG. 6, the spring 15 is placed in tension and the valve spool assembly is moved upwardly at a rate determined by the flow through the filters 66 and 67. During movement of the piston rod 13 out of the housing, oil from the reservoir 22 moves into the ride control cylinder through the oil-in check valve 73 and, when the valve spool has moved to a raised follower position the groove 62b in the spool control valve will be in alignment with the ports 62 and 62a so that oil can move from within the lift cylinder 35 to the reservoir 22. The lift cylinder 35, the spring retainer 36 carried thereby, the expanded main spring 40, the piston rod 13 and piston 12 can all then move downwardly, since there is no longer sufficient pressure in the lift cylinder to hold them up until such time as the control valve spool assembly 18a is moved and groove 62b is no longer in communication within ports 62 and 62a. At this time, the load leveller has again achieved its over-all "normal" length.

It will be apparent that the size of the port 65 will determine the speed with which the load leveller readjusts for changing load conditions. Normally the port 65 will be quite small so that the load leveller will not over-compensate and adjust during turns, normal road oscillations, etc., but so that it will properly compensate for load changes in the vehicle on which it is used.

As shown schematically in FIG. 10, it is also possible to use a time delay reset that will allow fluid discharge from beneath the valve spool assembly as it is moved down. The time delay reset comprises a passage 84 interconnecting the ride control cylinder 11, beneath the valve spool 18 and the oil reservoir 22. A check valve 85 in the passage allows flow from the ride control cylinder beneath the dashpot formed by the control valve spool assembly to the oil reservoir, but prevents reverse flow, thereby allowing the cup-shaped body to move further down within the control valve body 53.

The control valve spool assembly 18 can, of course, move more rapidly down in the ride control cylinder if part of the oil therebeneath is moved out through the check valve 85. By regulating the pressure at which the check valve 85 opens, either by spring selection or by setting an adjustable valve, the speed of movement of the control valve and therefore the response time of the load leveller can be varied.

A flexible boot 86, made of butyl rubber, or other suitable flexible material, is provided to cover the lift cylinder and the oil reservoir, beneath the main spring 40. The boot 86 fits tightly around the top of the oil reservoir 32, but does not block air flow past the screw 31 or around the piston rod 13. The boot is convoluted to the upper end of the lift cylinder 35 and then preferably has a straight wall extending to the spring retainer 36, where it is sealed to the lift cylinder wall. The convolute configuration allows the boot to expand and contract as the lift cylinder is raised and lowered along the reservoir.

With the construction shown, the boot provides an additional seal against entry of dirt or the like into the lift cylinder, and as a protector for the entire unit. As arranged, the main spring 40 will also serve to protect the lift cylinder and reservoir against damage from flying rocks and the like.

Although preferred forms of my invention have been herein disclosed, it is to be understood that the present disclosure is made by way of example and that variations are possible without departing from the subject matter coming within the scope of the following claims, which subject matter I regard as my invention.

I claim:

1. A load leveller for use with vehicles and the like comprising
    a ride control cylinder;
    an oil reservoir;
    a lift cylinder having a seal member fixed relative to the oil reservoir and a movable seal member;
    displacement means adapted to reciprocate into and out of said ride control cylinder;
    a main spring having one end carried by the movable member of the lift cylinder and another end fixed to the displacement means exteriorly of the ride control cylinder; and
    control valve means adapted to interconnect the oil reservoir with the lift cylinder between the fixed and movable seal members and with the ride control cylinder, said control valve means including a fixed body member and a movable spool valve member, means resiliently connecting the spool valve member to the displacement means, said spool valve member having a restriction therethrough whereby oil moves through said restriction as said spool valve member is moved in response to movement of the displacement means, said oil flow through said restriction regulating the speed of movement of the spool valve member and preventing corresponding travel of the displacement means and spool valve member.

2. A load leveller as in claim 1, wherein
the oil reservoir surrounds the ride control cylinder the lift cylinder is concentric with the oil reservoir and the main spring extends over the lift cylinder.

3. A load leveller as in claim 2, wherein
    an exterior wall of the oil reservoir forms an inner wall of the lift cylinder and carries the seal member fixed relative to the oil reservoir; and
    an outer wall of the lift cylinder is spaced from and is slidable with respect to the inner wall and comprises a movable member of the lift cylinder, said outer wall carrying the movable seal member and means for anchoring one end of the main spring thereto.

4. A load leveller as in claim 3, further including
a flexible, expansible boot sealingly connected to the oil reservoir and to the lift cylinder to seal the sliding connection therebetween.

5. A load leveller as in claim 1, wherein
the displacement means comprises a piston rod extending into and out of the ride control cylinder and a piston in the cylinder on the end of the piston rod, said piston having passages therethrough and check valves allowing flow through said check valves in both directions of travel of the piston in the ride control cylinder.

6. A load leveller as in claim 1, further including
filter means in the restriction of the spool valve member, through which oil is passed.

7. A load leveller as in claim 6, wherein the filter means comprises
a pair of sintered metal filters having their bases clamped together and secured in said restrictions.

8. A load leveller as in claim 1, wherein the means resiliently connecting the spool valve member to the displacement means comprises a spring.

9. A load leveller as in claim 1, further including
a spring retainer fixed to and movable with the movable seal member of the lift cylinder to support the end of the main spring carried by said movable seal member.

10. A load leveller as in claim 9, wherein
the movable seal member of the lift cylinder comprises a tube spaced from and surrounding a wall of the oil reservoir, said tube having the spring retainer carried by one end thereof, and seal means carried by the other end thereof, said seal means being adapted to seal against and slide on the wall of the reservoir, and wherein
the wall of the oil reservoir has a seal means thereon, sealingly and slidably engaging the movable member of the lift cylinder; and further including
passage means adapted to communicate the interior of the oil reservoir with a space between the seal means carried by the movable member and the seal means on the wall of the reservoir through the control valve means.

11. A load leveller as in claim 10, further including
a bearing member fixed to one end of the lift cylinder by a snap ring inserted into and projecting from the spring retainer; and wherein
the spring retainer is fixed to the lift cylinder by a snap ring inserted into and projecting from the wall of the lift cylinder.

12. A load leveller as in claim 1, wherein
the oil reservoir has an upper end thereof, a filler port through a wall at the said upper end and a screw loosely threaded into said filler opening to prevent passage of oil therethrough while allowing air to pass therethrough.

13. A load leveller as in claim 12, wherein
a seal is provided between the oil reservoir upper wall and the displacement means, said seal allowing reciprocation of the displacement means therethrough and fitting tightly enough against the displacement means to prevent oil flow therebetween while allowing air passage therebetween.

14. A load leveller as in claim 13, further including
a restrictor bearing in an upper end of the lift cylinder and surrounding the displacement means, said restrictor bearing having a small portion extending tightly into the lift cylinder and with small air passages at the periphery thereof extending through the small portion to intersect with radial ports extending from the center of the small portion, through which the displacement means passes, radially outwardly to the passages, and further having a larger portion with a shoulder thereof resting on and sealing the upper end of the lift cylinder and a peripheral bead extending upwardly therefrom to sealingly engage a shoulder of the oil reservoir, and small ports through said bead whereby a limited amount of oil from the reservoir can pass through the ports in the bead to accumulate as a liquid seal on the larger portion of the restrictor bearing, beneath the seal between the oil reservoir and the displacement means.

15. A load leveller as in claim 1, wherein
the oil reservoir is formed by a cylindrical housing spaced from and surrounding the lift cylinder;
the lift cylinder comprises a tube spaced from and surrounding the oil reservoir; and
the main spring comprises a coiled spring surrounding the lift cylinder.

* * * * *